US011840405B2

(12) United States Patent
Ziegler

(10) Patent No.: US 11,840,405 B2
(45) Date of Patent: Dec. 12, 2023

(54) BELT CONVEYOR AND DRUM FOR A BELT CONVEYOR

(71) Applicant: Voith Patent GmbH, Heidenheim (DE)

(72) Inventor: Manfred Ziegler, Erftstadt (DE)

(73) Assignee: Voith Patent GmbH, Heidenheim (DE)

( * ) Notice: Subject to any disclaimer, the term of this patent is extended or adjusted under 35 U.S.C. 154(b) by 130 days.

(21) Appl. No.: 17/425,770

(22) PCT Filed: Dec. 19, 2019

(86) PCT No.: PCT/EP2019/086424
§ 371 (c)(1),
(2) Date: Jul. 26, 2021

(87) PCT Pub. No.: WO2020/151892
PCT Pub. Date: Jul. 30, 2020

(65) Prior Publication Data
US 2022/0048715 A1 Feb. 17, 2022

(30) Foreign Application Priority Data

Jan. 24, 2019 (DE) .......................... 102019101698.3

(51) Int. Cl.
*B65G 43/02* (2006.01)
*B65G 23/04* (2006.01)
*G01L 1/22* (2006.01)
*G01P 15/18* (2013.01)

(52) U.S. Cl.
CPC ............. *B65G 43/02* (2013.01); *B65G 23/04* (2013.01); *G01L 1/22* (2013.01); *G01P 15/18* (2013.01); *B65G 2203/0266* (2013.01); *B65G 2203/042* (2013.01)

(58) Field of Classification Search
None
See application file for complete search history.

(56) References Cited

U.S. PATENT DOCUMENTS

| 4,587,852 | A  | * | 5/1986 | Butler | G01L 5/101 |
|---|---|---|---|---|---|
|  |  |  |  |  | 198/810.04 |
| 8,260,574 | B1 | * | 9/2012 | Schuitema | B65G 47/844 |
|  |  |  |  |  | 702/183 |
| 9,227,791 | B2 | * | 1/2016 | DePaso | B65G 43/00 |
| 9,533,832 | B1 | * | 1/2017 | Wheat | B65G 43/04 |

(Continued)

FOREIGN PATENT DOCUMENTS

| DE | 102016114524 A1 | 2/2018 |
|---|---|---|
| WO | 2012057680 A1 | 5/2012 |

(Continued)

*Primary Examiner* — Kavel Singh
(74) *Attorney, Agent, or Firm* — Laurence A. Greenberg; Werner H. Stemer; Ralph E. Locher

(57) ABSTRACT

A belt conveyor has at least one drum. The drum has a drum axle and a drum body with a drum shell and drum bases. The drum axle is mounted on the two sides by way of two bearings. A force measuring device and/or an accelerometer are arranged on the drum axle on the two sides. The sensors which are arranged on the two sides are preferably arranged between the drum body and the bearing outside the drum body. The sensor signals can be transmitted wirelessly by way of a telecommunications device which is assigned to the sensors.

18 Claims, 1 Drawing Sheet

(56) References Cited

U.S. PATENT DOCUMENTS

| | | | |
|---|---|---|---|
| 10,513,398 B2* | 12/2019 | Roelfsema | B65G 13/07 |
| 10,836,585 B2* | 11/2020 | DeVries | B65G 45/12 |
| 2003/0030565 A1 | 2/2003 | Sakatani et al. | |
| 2004/0154413 A1* | 8/2004 | Coy | G01M 13/023 |
| | | | 73/862.453 |
| 2019/0207487 A1 | 7/2019 | Hamacher | |

FOREIGN PATENT DOCUMENTS

| | | |
|---|---|---|
| WO | 2015042661 A2 | 4/2015 |
| WO | 2016019431 A1 | 2/2016 |
| WO | 2016135642 A2 | 9/2016 |

* cited by examiner

BELT CONVEYOR AND DRUM FOR A BELT CONVEYOR

BACKGROUND OF THE INVENTION

Field of the Invention:

The invention relates to drums for a belt conveyor, to a belt conveyor, and to a method during the operation of the belt conveyor.

Drums in conveyor systems have to be satisfactorily aligned, in order that skewed running of the belt does not occur. On account of the size and the weight, the handling is difficult, and the alignment by way of aids such as a spirit level, laser measuring units or the like is time-consuming and laborious. A misalignment can also often occur only during running operation, for example as a result of deformation of the steelwork or movement of the underlying surface. The reliable detection of a misalignment of this type is currently not yet possible.

Furthermore, defective drums are frequently the cause of unplanned operating down times. Moreover, damage which is detected too late, such as, for instance, cracks in the drum shell or drum base, can lead to serious damage of the belt.

Belt damage frequently occurs as a result of the partially very highly pretensioned belt wrapping around the drum, if foreign objects get between the belt and the drum. This is the case, in particular, when the belt runs onto the drum from below. Since the foreign object is ejected again onto the running-on belt, repeated circulation with correspondingly high damage can occur on the belt.

WO 2015/042661 A2 has disclosed a bearing roller for a belt conveyor, which bearing roller is provided with sensors, in particular temperature sensors for monitoring the state of the bearing roller. The bearing roller is provided with a generator for the generation of electric energy.

WO 2016/135642 A2 has disclosed a belt conveyor which is provided with a system for the prevention of fire. The shaft of a belt roller of the belt conveyor is provided with a temperature sensor. Said sensor is assigned a transmitter, the transmitter transmitting the sensor signals to a provided receiver. The energy which is required for said sensor system is generated in an inductive manner in the belt roller.

WO 10033526 A1 has disclosed, for example, a system for monitoring the state of the conveyor belt.

Down times of a belt conveyor system can be due to skewed belt running, drum damage and belt damage.

BRIEF SUMMARY OF THE INVENTION

It is the object of the invention to reduce the operating costs and the down times of the belt conveyor.

According to the invention, the object is achieved by way of an embodiment as claimed in. Further advantageous features of the embodiment according to the invention are found in the subclaims.

In order to achieve the object, it has been shown to be advantageous to provide a drum with a sensor system, in order for it to be possible for a misalignment and/or belt damage to be detected by way of the drum itself. As a result, switching off of the belt conveyor and/or an indication of the type of damage and the location of damage in the belt can take place. In particular, the production of damage can be prevented in the case of a misalignment and in the case of a foreign object on the drum body. Force measuring devices and/or accelerometers are provided for said damage detection.

It has been shown to be advantageous that in each case at least one force measuring device and one accelerometer, preferably one triaxial accelerometer, are provided on each side of the drum axle.

It is provided in one advantageous embodiment that the force measuring device comprises strain gages. Strain gages have been shown to be particularly suitable, since they are highly robust and inexpensive and supply highly accurate measured values.

Each force measuring device preferably consists of at least two strain gages which are arranged offset on a circular ring. The number and arrangement of the strain gages are ideally selected in such a way that at least one strain gage per force measuring device is always situated in the same circular segment as the belt which is in contact. As a result, a satisfactory signal for the detection of belt damage, a foreign object or a belt connection can be generated at any time.

In one preferred embodiment, an energy generation device, preferably a generator, is arranged between the drum shell and the drum axle. As a result, the sensors can be supplied with electric energy, and a telecommunications device and also a signal processor can possibly also be supplied with electric energy. In this way, a cabled energy supply from the outside is not required, which simplifies the construction. In the case of the use of a discharging energy store, regular replacement would be required, which is a disadvantage. The space which is present within the drum shell and the drum base can be utilized for the arrangement. The energy supply is arranged within the drum in a manner which is protected, for example against moisture and dust.

It is provided in one preferred embodiment that the sensors are arranged between the drum shell and the bearing of the drum axle. As a result, the sensors are readily accessible from the outside and, in the case of a defect, can be replaced easily. Moreover, in particular, misalignments of the drum can be detected particularly satisfactorily on the basis of the deviations of the sensor data of the two sides from one another. The deviation can be a difference or else a temporal offset.

It is provided in one design variant that a signal processor is arranged on the drum axle. Processing of the measured data can already be performed by way of said signal processor. As a result, it is possible for the data quantity of transmitted data to be reduced, by only data sets being transmitted which indicate a misalignment and/or damage of the belt and/or the bearing.

It has been shown to be advantageous to provide a telecommunications device. The measured data of the sensors can be transmitted wirelessly by means of said telecommunications device.

It has been shown to be advantageous to arrange the telecommunications device outside the drum body, since this leads to a higher signal strength.

In one design variant, a signal line can be provided for data transmission, for example by means of a slip ring. This can be provided, in particular, under difficult ambient conditions, in the case of which wireless transmission is problematic or unreliable.

In the case of the method for functional monitoring of a belt conveyor, in particular for monitoring by means of a drum as claimed in one of claims 1 to 9, it is provided that sensor data which are assigned to each drum side, in particular data of force measuring devices and/or accelerometers, are detected with temporal assignment. A comparison of the temporally assigned sensor data takes place. Said sensor data are also called measured data.

In a data processing means, a misalignment and/or belt damage on account of a foreign object are/is detected. Detected differences of the sensor data of the different sides which can comprise both a difference and a temporal offset are used for this purpose.

It can be provided here in one preferred embodiment to already carry out processing of the measured data and to transmit only data sets, in the case of which there are abnormalities. As a result, the quantity of transmitted data can be reduced. Data can be stored in the data processing means, preferably in the central data processing means, which data directly allow the output of a misalignment or the indication as to which type of damage of the belt is present at which location.

It is provided in one advantageous embodiment for a misalignment of the drum to be detected by means of the measured force data and the data of the accelerometers.

It is provided in one embodiment that the sensor data are generated by sensors, consisting of force sensors and/or accelerometers arranged on the two sides, between the drum base and the bearing. Misalignments can be recognized particularly clearly from the sensor data as a result.

It has been shown to be advantageous to provide at least one drum of this type and a belt conveyor in such a way that the belt tensile force at the two ends of the unloaded lower run can be determined in conjunction with the measurement of the belt pretension. The belt tensile forces upstream and downstream of the drum of this type can be determined as follows:

in the case of a drum which is neither driven nor braked, the two belt tensile forces are approximately identical. The difference arises as a result of the bearing frictional moment and can be ignored in comparison with the belt tensile forces. Therefore, the belt tensile force upstream and downstream of the drum is in each case approximately half of the axle load which is measured by means of force sensors.

In the case of a driven or braked drum, the two belt tensile forces upstream and downstream of the drum differ by way of the circumferential force which can be determined from the torsional stress proportion of the force measuring devices.

If the belt tensile forces at the two ends of the unloaded lower run are known, it is possible to determine the supporting roller resistance in a manner which is based on the measured data of the force measuring devices. Therefore, the use of a drum of this type is advantageous, in particular, as a supplement to the BeltGenius ERIC product from Voith.

Since the drum periodically comes into contact with the entire belt, it is possible to monitor the quality of the belt and the belt connections. Statements about the quality of the belt and the belt connections can be generated both from the measured data of the acceleration data and from the force/torsional torque data. The combination results in the best resolution and accuracy.

Further advantageous forms of the invention will be described on the basis of exemplary embodiments with reference to the drawings. The indicated features can advantageously be implemented not only in the combination which is shown, but can also be combined individually among one another. In detail, in the figures:

In the following text, the figures will be described in greater detail.

DETAILED DESCRIPTION OF THE INVENTION

Figure 1:
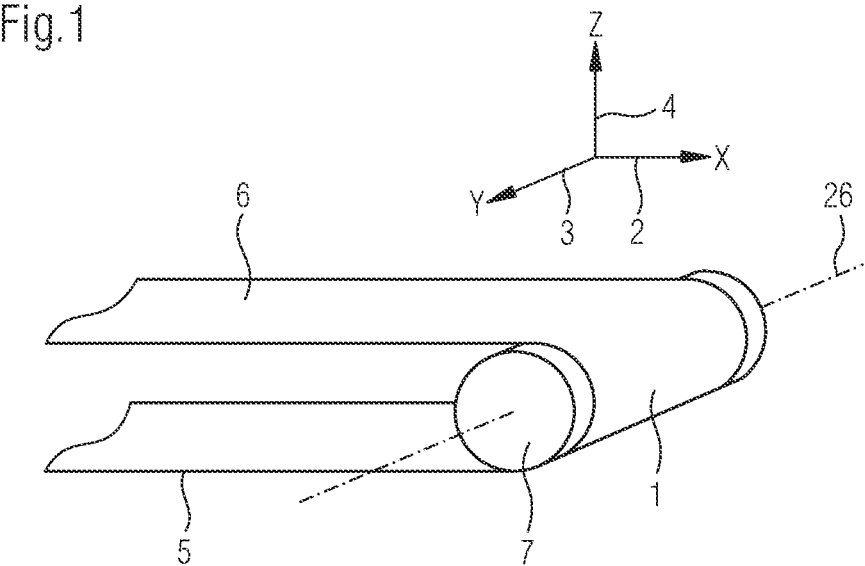
FIG. 1 shows a conveyor belt with a deflection drum.

FIG. 1 shows a detail of a belt conveyor. A drum 7 is shown. A belt 1 is deflected by way of the drum 7. The belt comprises a part which is called the upper run 6 and a part which is called the lower run 5. The running direction of the belt is denoted as the belt longitudinal axis with the x-axis. The belt transverse axis 3 corresponds to the y-axis, and the z-axis 4 runs counter to the force of gravity.

Figure 2:
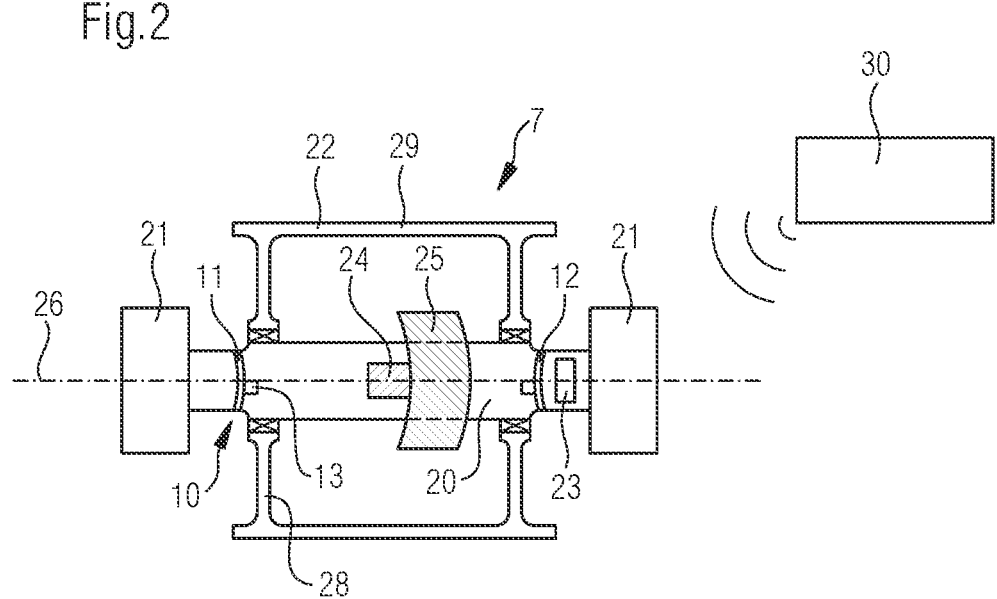
FIG. 2 shows the deflection drum in a sectional illustration.

FIG. 2 shows the drum 7 in detail. The drum 7 comprises a drum body 22 which is mounted on a drum axle 20. The drum axle 20 is mounted on the two sides by way of bearings 21. The rotational axis of the drum axle is denoted by way of 26.

For the monitoring tasks, a drum 7 is equipped with a sensor system 10 for recording measured signals, a signal processor 24 for signal processing, and with a telecommunications device 23. The recorded and generated data can be received by way of an associated central data processing means 30.

Specifically, force measuring devices 11 are arranged on a drum axle 20. In the embodiment which is shown, strain gages 12 are provided for the detection of flexural and torsional stresses. In the illustration which is shown, said strain gages 12 are provided on the two sides. Moreover, (preferably triaxial) accelerometers 13 are attached on the drum axle 20, preferably also on the two sides. The required electric energy for the sensor system 10, the signal processor 24 and the remote data transmission means 23 is effected by way of an integrated generator 25. The generator generates the electric energy from the drum rotational speed.

Alignment

The belt straight running and the central position of the belt 1 on the drum 7 are detected by the force measuring devices 11. A misalignment of the drum axle 20 in relation to the belt longitudinal axis 2 can be based on the following angular errors:

Rotation about the vertical axis 4, z-axis in FIG. 1:

This leads to increased edge stresses on the one side and to decreased edge stresses on the other side, as a result of which the belt 1 is steered in the direction of the smaller edge stresses. Whereas, in the case of a centrally lying belt 1 and a symmetrical belt tension distribution, the two force measuring devices 11 on the drum axle 20 on the left and the right between the drum base 28 and the bearing 21 supply equally great forces in the z-direction and practically no forces in the Y-direction, a rotation about the z-axis leads to unequal forces on the left and the right in the x-direction and to axial forces in the y-direction. A conclusion can be made about the magnitude of the rotational angle about the z-axis based on the axle load (sum of the two forces in the x-direction) and the axial force. A conclusion can be made about the position of the belt on the drum based on the ratio of the two forces in the x-direction.

Rotation about the belt longitudinal axis 2 (x-axis in FIG. 1):

The orientation of a 3D accelerometer 13 in three dimensions can be determined unambiguously, since the acceleration due to gravity is echoed in accordance with the rotation of the sensor in the 3 coordinate axes. If, for example, the two accelerometers 13 are oriented on the shaft in such a way that their y-component lies parallel to the drum axle 20, and if the drum 7 is oriented horizontally in an ideal manner (no rotation about the X-axis), the acceleration due to gravity is found as a sine and cosine signal merely in the x-components and z-components in accordance with the rotational angle of the drum axle, whereas the y-component does not measure a signal from the acceleration due to gravity.

In the case of a rotation of the drum 7 about the x-axis 2, the y-component also has a signal from the acceleration due to gravity, which signal fluctuates periodically with the drum rotational speed and the magnitude of which corresponds to the angular error.

Drum Damage:

In the case of intact drum bases 28 and drum shell 29, the drum body 22 increases the section modulus of the drum 7 against deflection which is brought about by the weight of the drum, but mainly from the belt tension. The force signals from the two force measuring devices 11 periodically have an identical behavior, and the deflection is found as a sinusoidal force signal in the y-direction of identical magnitude in the opposite direction. A crack in one of the two drum bases 28 or in the drum shell 29 will lead to a characteristic disruption of said signals, and make a determination of the size and the position of the crack possible in the comparison of the signals from the two sides of the drum 7. In order to determine the signal pattern of damage of this type, the effect of different crack shapes on the stress distribution in the drum axle 20 can be calculated by means of FEM. This information can be stored in a memory. As a result, an assignment and characterization of the damage is possible. The signals of the accelerometers 13 can be used for an assessment of the state of the two bearings 21.

Belt Damage by Way of Foreign Objects:

If a foreign object (for instance, a stone) gets between the drum and the belt, this will be seen clearly in the signals of the two force measuring devices 11. A conclusion can be made about the position of the foreign object in the y-direction from the comparison of the two interference signals on the left and on the right, and a conclusion can be made about the size of the damage from the magnitude of the signal. An indication of where and in which belt part piece the expected damage is situated precisely is likewise possible, and will be described in the following text.

Monitoring of the Belt and Belt Connections:

The complete conveyor belt 1 of a belt system is composed of individual belt part pieces, usually by way of vulcanization of the correspondingly prepared belt ends, in part also by way of mechanical clamp connections in the case of belts with a lesser strength. In the two cases, the connections represent a spatially sharply delineated inhomogeneity of the belt which can be found clearly both in the signals of the force measuring devices 11 and also in those of the accelerometers 13. Since all the belt pieces do not have the same length, a conclusion can be made as follows about the belt longitudinal coordinate based on the sequence of the connections: the drum rotational speed can be determined very accurately from the signals of the sensors 10. An accurate speed signal, the temporal integration of which supplies the longitudinal coordinate, can be determined on the basis of the drum rotational speed and by way of the likewise known drum diameter. If the belt 1 itself tends toward skewed running, for instance because connections are manufactured in a skewed manner or because the belt tension force is not distributed symmetrically across the belt cross section on account of faults in the manufacturing process, this will be seen in the force signals. The sum of the two force signals, adjusted by the proportion from the drum weight, corresponds to the axle load from the two belt forces (running-on and running-off belt). The magnitude of said axle load is dependent on the loading and the current drive power, and therefore normally changes only very slowly. Skewed running which is produced from the belt itself will lead to a pattern, which repeats with the circulating frequency of the belt, in the distribution of the axle load to the two force measuring devices 11, and can therefore be detected and analyzed. A connection which is becoming defective should make itself noticeable by way of a change in the signal pattern of said connection when passing the drum 7. Overstretched edge cables of the belt displace the axle load toward the "healthy" side. A cross fracture of the edge is shown in a temporally sharply delineated asymmetrical distribution of the axle load.

The permanent measurement of the axle load and the drum rotational speed makes it possible to produce load spectra and perspective service life forecasts.

In the case of drive drums, in the case of which there is a torque measurement in the drivetrain upstream of the transmission, the behavior of the transmission can be monitored by way of comparison of the torque measurement upstream of the transmission input with the torque measurement on the drum axle 20. The torque measurement upstream of the transmission can take place, for example, in the transmission-side part of a filling-controlled start-up clutch (also called a turbo clutch). The described detection of the belt longitudinal coordinate can be utilized to provide an application, it being possible for the application to be displayed by mobile devices. As a result, it becomes possible to view the measured data and the evaluation both in a remote mode and when the user is on site. Thus, for example, the user can be shown what damage is where in the belt,
a targeted shutdown of the belt at a preselected location can be made possible by way of access of the central data processing means 30 to the drive of the belt conveyor.

Said access can also be provided by way of a mobile device by means of the application. Moreover, a manual input of belt damage with assignment of the current belt position can also be provided.

In conjunction with the BeltGenius ERIC product from Voith, the use of at least one intelligent drum of this type in a suitable position in relation to the measurement of the belt pretensioning force of a belt system is advantageous. In particular, a provision of a drum of this type at the rear has been shown to be advantageous.

Valuable additional information can be detected. On the basis of said data, for example, the support roller running resistance can be determined more accurately, or the absence of a customer-side measurement of the belt tensile force can be compensated for.

As an alternative to the force measuring devices on the drum axle, sensors for the detection of the axle load in the bearings or the bearing contact areas can also be used.

LIST OF DESIGNATIONS

1 Belt, conveyor belt
2 Belt longitudinal axis, x-axis (running direction of the belt)
3 Belt transverse axis, y-axis
4 z-axis, vertical axis
5 Lower run
6 Upper run
7 Drum
8
9
10 Sensor system, sensors 11 Torque sensor, force measuring device
12 Strain gauge
13 Accelerometer, triaxial
20 Drum axle, axle
21 Bearing
22 Drum body
23 Transmitting and receiving device, telecommunications device
24 Signal processor
25 Electric energy generation means, generator
26 Rotational axis
28 Drum base
29 Drum shell
30 Central data processing system

The invention claimed is:

1. A drum for a belt conveyor, the drum comprising:
a drum axle and bearings for mounting said drum axle;
sensors disposed on said drum axle, said sensors including at least one sensor being a triaxial accelerometer at each of two end sides of said drum axle;
said sensors being selected from the group consisting of a force measuring device and a triaxial accelerometer.

2. The drum according to claim 1, wherein at least one force measuring device and said triaxial accelerometer are disposed on each side of said drum axle.

3. The drum according to claim 1, wherein said force measuring device comprises strain gages.

4. The drum according to claim 3, wherein said strain gages of said force measuring device are arranged in an annular arrangement.

5. The drum according to claim 1, the drum having a drum body with a drum shell and a drum base, and an energy generation device arranged between said drum shell and said drum axle.

6. The drum according to claim 5, wherein said energy generation device is a generator.

7. The drum according to claim 5, wherein said sensors are arranged between said drum base and the respective said bearing of said drum axle.

8. The drum according to claim 1, wherein said sensors are configured to issue sensor signals and the sensor signals are transmitted wirelessly by way of a telecommunications device assigned to said sensors.

9. The drum according to claim 8, wherein said telecommunications device is arranged outside a drum body of the drum.

10. The drum according to claim 8, further comprising a signal processor for processing the sensor signals arranged on said drum axle.

11. A method for functional monitoring of a belt conveyor, wherein:
detecting sensor data assigned to each drum side of a drum of the belt conveyor, and temporally assigning the sensor data;
determining a deviation of the sensor data that are assigned temporally with respect to one another; and
processing the sensor data in a data processor and determining a misalignment and/or belt damage based on the detected deviation; and generating the sensor data by sensors, force sensors, and/or accelerometers arranged on two sides between a drum base and respective bearings of the drum.

12. The method according to claim 11, which comprises acquiring sensor data with force measuring devices and/or accelerometers.

13. The method according to claim 11, which comprises providing a drum according to claim 1 and monitoring the conveyor belt by way of said drum.

14. The method according to claim 11, which comprises supplying the sensors with electric energy by way of a generator arranged within a drum body.

15. The method according to claim 11, which comprises detecting measured force values by way of strain gages which are arranged on a drum axle on two sides of the drum.

16. The method according to claim 11, which comprises detecting data of a triaxial acceleration measurement device in a temporally assigned manner and transmitting the data to a data processor.

17. A drum for a belt conveyor, the drum comprising: a drum axle and bearings for mounting said drum axle; sensors disposed on said drum axle, said sensors including at least one sensor at each of two end sides of said drum axle; a signal processor for processing the sensor signals arranged on said drum axle; said sensors being selected from the group consisting of a force measuring device and an accelerometer; and said sensors being configured to issue sensor signals and the sensor signals being transmitted wirelessly by way of a telecommunications device assigned to said sensors.

18. The drum according to claim 17, wherein said accelerometer is triaxial accelerometer.

* * * * *